Jan. 31, 1933.   H. ANSCHÜTZ-KAEMPFE   1,895,628
GYROSCOPIC INSTRUMENT
Filed April 15, 1929

Inventor
Hermann Anschütz-Kaempfe
By Pennie, Davis, Marvin Edmonds
Attorneys

Patented Jan. 31, 1933 1,895,628

UNITED STATES PATENT OFFICE

HERMANN ANSCHÜTZ-KAEMPFE, OF MUNICH, GERMANY, ASSIGNOR TO NEDERLAND-SCHE TECHNISCHE HANDEL MAATSCHAPPIJ "GIRO", OF THE HAGUE, NETHER-LANDS

GYROSCOPIC INSTRUMENT

Application filed April 15, 1929, Serial No. 355,160, and in Germany April 17, 1928.

My invention relates to gyroscopic instruments, and more particularly to gyroscopic compasses.

One of the primary objects of my invention is a gyroscopic instrument equipped with a plurality of gyroscopes which will maintain a true horizontal position irrespective of accelerations of any kind or of variations in the geographic latitude of the location of the instrument.

Another object is a gyroscopic compass of the multi-gyroscope type having a gyroscopic system, the period of oscillation of which is independent of the geographic latitude and is the same about all of the principal axes.

In the Patent No. 1,186,339 granted June 6, 1916, to Schuler the principle has been disclosed according to which the ballistic errors of the single-gyroscope compass are reduced by the addition of auxiliary gyroscopes which lengthen the period of oscillation of the indicator system about the north—south line. A constructional example described in the specification comprises two gyroscopes mounted on a floating support and anchored by a spring in their relative position of rest, both these gyroscopes contributing to produce the directing force and stabilization about the north—south line.

As described in Patent No. 1,480,637 to Schuler, a gyroscopic system is free from pendulous movements (due to alterations in the speed or course of the ship) if its period of oscillation is about 84 minutes. In the constructions known prior to my invention, however, this condition could be fulfilled only for a particular latitude because a change of latitude meant an alteration in the period of oscillation, which for example decreases when nearing the equator. Various attempts have been made to eliminate such alteration. It has been proposed by me to rotate the gyroscopes faster or slower, in accordance with the geographic latitude, and thus alter the momentum of the gyroscope while the action of gravity on the gyroscopic system remained unchanged. Another method was to leave the moment of the gyroscope unaltered and provide devices such as adjustable weights co-ordinated to the gyroscopic system whereby the action of gravity was altered to affect the period of oscillation. In both these proposals, however, interference with the compass or its auxiliary apparatus is unavoidable and entails possible disturbances in the readings. Moreover, corrections of the kind under consideration cannot be evenly and continually performed but in stages only, and are also dependent upon the attention and the skill of the members of the crew; this is clearly a defect.

My invention now provides a gyroscopic compass of the multi-gyroscope type, in which the period of oscillation is automatically and evenly regulated to remain constant irrespective of variations in latitude of the location of the gyroscopic instrument.

A preferred embodiment of my invention is shown in the accompanying drawing in which Fig. 1 is a horizontal cross-section through the support of the gyroscopes corresponding to the support $k$ shown in the afore-mentioned Patent No. 1,186,339, the gyroscopes being in operative position;

The support 1 which is preferably in the form of a casing enclosing the gyroscopes, is so mounted as to be swingable about its three principal axes and to tend, under the action of gravity, to assume a definite normal position relative to the horizon. The means for mounting the support 1 are not shown and described herein, as they are well known in the art and do not form part of my present invention. Reference is made again, however, to the afore-mentioned patent to Schuler No. 1,186,339 disclosing such means.

Figure 1:
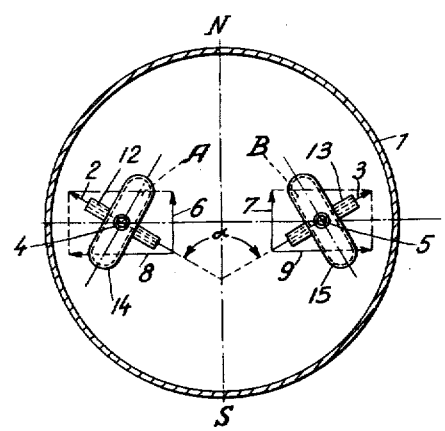

The arrows 2 and 3 represent the impulse vectors of two gyroscopes A and B of equal size operated at equal angular velocity. Each of the carriers 14 and 15 in which the bearings of the gyroscope axles 12 and 13 are mounted, is rotatably supported at the points 4 and 5 to swing about an axis perpendicular to the normally horizontal plane of the support. The arrows 6 and 7 are the directing components of the force operative to keep the axis N—S of the system pointed towards the north direction, while the arrows 8 and 9 represent those components of the force 2, 3 which counteract oscillations about the N—S axis and thus stabilize the gyroscopic system. It may be clearly seen from Fig. 1 that the directing components 6 and 7 increase as the axes 12 and 13 of the gyroscopes swing about the points 4 and 5 nearer their position parallel to the N—S line, and decrease as the angle formed between 12 and 13 increases. If this angle be $\alpha$ and the impulse 2, or 3 respectively, of each gyroscope be $J$, we have a total impulse $2J \cdot \cos \frac{\alpha}{2}$ for the directing force and therefore for the period of oscillation.

In order to counteract lengthenings or shortenings of the period of oscillation entailed by a change of latitude I have provided means which cause the angle $\alpha$ to be increased when the instrument approaches the pole and to be decreased when it moves towards the equator. Preferably, the gyroscopes are so mounted and disposed that they may set themselves automatically in accordance with the requirements mentioned in the foregoing. The latter are entirely fulfilled when the ratio between $\cos \frac{\alpha}{2}$ and the cosine of the geographic latitude remains the same for all latitudes coming into consideration in practice.

Figure 2:
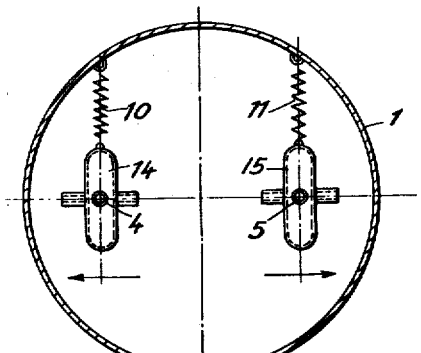
Fig. 2 is a similar view, the gyroscopes being at rest.

The purpose in view may be served by various constructions but that diagrammatically shown in Fig. 2 is extremely simple and carries into effect the theoretical result to its nearest approximation.

In this construction the instrument is equipped with two gyroscopes. It is to be understood, however, that my invention is applicable to any gyrocompass or similar instrument comprising a plurality of gyroscopes each of which is capable of a swinging movement of its axle within a predetermined plane of the support, provided that all of said planes assume a predetermined relative position. In the embodiment shown, each of the two gyroscopes is mounted on the support 1 to be swingable with its axle in a horizontal plane of the support.

The two gyroscope carriers 14 and 15 which are swingable about the vertical axes 4 and 5 are connected to the system 1 by springs 10 and 11 adjusted so that the angle $\alpha$ amounts to 180° when the gyroscopes do not rotate, and is reduced to 126½° when the said gyroscopes are rotating and when the compass is located at the equator. The force loading the springs 10 and 11 when the compass is in operation is derived from the action of the rotation of the earth upon the gyroscope spindles which tend to point towards the North Pole with their north ends. The forces under consideration are very small so that the springs need exert only a correspondingly small opposing force, while the bearings 4 and 5 must afford easy movement.

Both these requirements may be best answered by relieving the bearings of the pivots 4 and 5 by suspending the carriers 14 and 15 which contain the heavy gyroscope members on torsion wires adjusted so that they exert the small spring force required.

Figure 3:
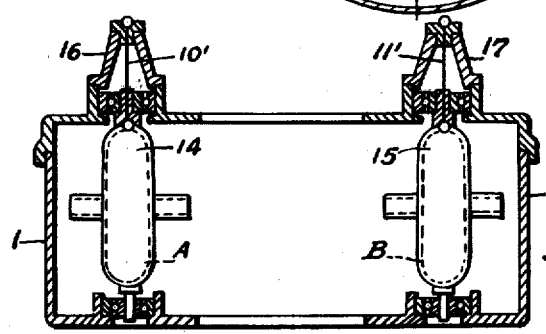
Fig. 3 is a vertical section through the support of another species, the gyroscopes assuming the position shown in Fig. 2.

This arrangement is illustrated in Fig. 3 showing a vertical section through the support 1. Each of the two carriers 14 and 15 which are formed by casings enclosing the gyroscopes, is suspended from the top of a bracket 16 or 17 respectively, mounted on the cover of support 1, by means of a torsion member 10', or 11' respectively, which is preferably in the form of a thin wire. Thus as will be easily understood, the members 10' and 11' perform the function of both thrust bearings and springs 10 and 11.

The same arrangement may obviously be provided in gyroscopic compasses in which the gyroscopic system has not the floating suspension described in Patent No. 1,186,339 and in which the indicator system is mounted in another manner.

In this patent it has been pointed out that in theory the apparent moments of inertia of the movable system should be the same for each plane, i. e. the period of oscillation for the rise and fall of the east and west points of the gyroscopic system should have the same value as for the meridian oscillations. It has hitherto been possible to disregard this theoretical requirement because no detectable ballistic error arises with much smaller periods of oscillation. If, however, the gyroscopic compass is to be used for maintaining and indicating the true horizon as well as the meridian, it is necessary that this condition should be fulfilled completely or at least with close approximation.

In a similar manner as explained in Patent No. 1,480,637 for a gyroscope having a generally vertical axle, a gyroscopic system including at least one gyroscope having a horizontal axle (such as shown in Patent 1,480,637) remains free from pendulous movements (notwithstanding any variation in the speed of the support) when the period of oscillation for the east and west elevation of the system amounts to 84 minutes. The present invention in eliminating any departure from the prescribed period of oscillation of the gyroscopic system provides a gyrostatic system which will maintain the true horizon regardless of changes in the latitude of its location.

In contrast with the instruments known prior to my invention the gyrostatic system heretofore described is capable of rendering an indication which is not subject to the necessity of corrections for earth rotation and movements of the ship. In a compass according to this invention the card of the indicator system or, more precisely, the normally horizontal plane of the gyroscope-support never deviates from the true horizon (when the card is adjusted for the purpose while the compass is stationary) irrespective of whatever horizontal acceleration the system is subjected to on a vehicle and irrespective of the rate of travel of the support.

This might appear paradoxical when taking into consideration that when the ship follows an easterly course the angular velocity of the compass relatively to the earth is added to the angular velocity of the earth in relation to space, but is subtracted therefrom when the ship follows a westerly course. In other words, the gyroscopes would have, in both cases, dissimilar precessional velocities about the north—south axis of the system relatively to space. The load on the constraining spring, however, is automatically somewhat increased owing to the above mentioned acceleration when the course is easterly, and the said load is suitably decreased when the course is westerly, so that the precessional velocity in relation to space will always amount to the desired value. Also, no deviations will occur under the influence of accelerations, provided that the relation between gravitational moment, gyroscopic moment (which depends on the rate of rotation of the gyroscopes), and spring action is correct, i. e. that the period of oscillation is 84 minutes in every plane.

Preferably, the springs 10, 11 or 10', 11' determining the relative position of the gyroscopes are so dimensioned and adjusted that the angle between the axes of the non-rotating gyroscopes in their position of rest amounts to 180° (as shown in Fig. 2), but amounts to about 126½° at the equator when the gyroscopes are operated at normal speed. Experience has shown that if this condition is complied with, the action of the spring is as slight as required in theory without unallowable and faulty positions being set up as a result of resilience.

Two apparently quite dissimilar requirements are met by precribing these two relative values. The stabilizing component $J \times \sin \frac{a}{2}$ and therefore the period of oscillation about the north—south axis vary in accordance with latitude, but these variations are only a very small percentage and therefore do not interfere with a satisfactory attainment of the required conditions.

What I claim is:

1. In a gyroscopic instrument, the combination of a plurality of gyroscopes, means mounting said gyroscopes to permit independent oscillation of their axles, and resilient means connected to said gyroscopes for normally urging their axles toward substantial alignment to automatically alter the relative position of said axles in dependence on the geographical latitude of the location of the instrument.

2. In a gyroscopic instrument, the combination comprising a support mounted to be swingable about its three principal axes and to tend, under the action of gravity, to assume a definite normal position relative to the horizon, a plurality of gyroscopes mounted in said support to be swingable about axes which are vertical to their axles and parallel to each other, at least one of said gyroscopes having a normally horizontal axle, and springs connecting said gyroscopes to said support for normally urging the gyroscope axles toward substantial alignment, said springs being so dimensioned as to respond to those variations in the effect of the rotation of the earth upon the gyroscopes which are due to a change in the geographic latitude of the locations of the instrument.

3. In a gyroscopic instrument, the combination comprising a support mounted to be swingable about its three principal axes and to tend, under the action of gravity, to assume a definite normal position relative to the horizon, at least two gyroscope-carriers mounted in said support, a gyroscope mounted on each of said carriers, torsion members connected to said support and to said carriers and serving to constrain the latter in a position in which the axles of said gyroscopes are substantially parallel, said torsion members being so dimensioned as to respond to those variations in the effect of the rotation of the earth upon the gyroscopes which are due to a change in the geographic latitude of the location of the instrument, substantially as described.

4. In a gyroscopic instrument, the combination of a plurality of gyroscopes, a support for said gyroscopes to permit oscillation in response to changes in terrestrial forces to which the gyroscopes are subjected, and means normally urging said gyroscopes independently toward a mutually parallel position in opposition to the directive forces thereof to compensate for the instantaneous geographic location of the instrument.

5. In a gyroscopic instrument, the combination of a plurality of gyroscopes, a support therefor in which the gyroscopes are independently movable about substantially vertical axes, and a spring connecting each of said gyroscopes to said support and normally urging their axes toward an angle of approximately 180°.

6. In a gyroscopic instrument, the combination of a support, a plurality of direction-seeking gyroscopes mounted on the support for independent oscillation of their axles, said gyroscopes normally tending to assume a position with their axles at an angle to each other when rotating, and torsion means between each gyroscope and the support opposing the tendency toward angular relation of the gyroscopes and urging them toward parallelism with their axles in substantial alignment.

In testimony whereof I have affixed my signature.

HERMANN ANSCHÜTZ-KAEMPFE.

CERTIFICATE OF CORRECTION.

Patent No. 1,895,628. January 31, 1933.

HERMANN ANSCHÜTZ-KAEMPFE.

It is hereby certified that error appears in the printed specification of the above numbered patent requiring correction as follows: Page 3, line 100, claim 3, strike out the words "the axles of"; and that the said Letters Patent should be read with this correction therein that the same may conform to the record of the case in the Patent Office.

Signed and sealed this 14th day of March, A. D. 1933.

M. J. Moore, (Seal)
Acting Commissioner of Patents.

a position with their axles at an angle to each other when rotating, and torsion means between each gyroscope and the support opposing the tendency toward angular relation of the gyroscopes and urging them toward parallelism with their axles in substantial alignment.

In testimony whereof I have affixed my signature.

HERMANN ANSCHÜTZ-KAEMPFE.

CERTIFICATE OF CORRECTION.

Patent No. 1,895,628.                                January 31, 1933.

HERMANN ANSCHÜTZ-KAEMPFE.

It is hereby certified that error appears in the printed specification of the above numbered patent requiring correction as follows: Page 3, line 100, claim 3, strike out the words "the axles of"; and that the said Letters Patent should be read with this correction therein that the same may conform to the record of the case in the Patent Office.

Signed and sealed this 14th day of March, A. D. 1933.

M. J. Moore, (Seal)                                Acting Commissioner of Patents.

CERTIFICATE OF CORRECTION.

Patent No. 1,895,628.  January 31, 1933.

HERMANN ANSCHÜTZ-KAEMPFE.

It is hereby certified that error appears in the printed specification of the above numbered patent requiring correction as follows: Page 3, line 100, claim 3, strike out the words "the axles of"; and that the said Letters Patent should be read with this correction therein that the same may conform to the record of the case in the Patent Office.

Signed and sealed this 14th day of March, A. D. 1933.

M. J. Moore, (Seal)  Acting Commissioner of Patents.